US011323317B1

(12) United States Patent
Levin et al.

(10) Patent No.: US 11,323,317 B1
(45) Date of Patent: May 3, 2022

(54) SOFTWARE CAPABILITIES MANAGEMENT FROM A SERVICE PROVIDER ENVIRONMENT

(71) Applicant: Amazon Technologies, Inc., Seattle, WA (US)

(72) Inventors: Alex Levin, Cupertino, CA (US); Ihab Bishara, Mountain View, CA (US); Georgy Machulsky, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/298,206

(22) Filed: Oct. 19, 2016

(51) Int. Cl.
*G06F 15/177* (2006.01)
*H04L 41/0806* (2022.01)
*H04L 67/00* (2022.01)
*G06F 8/656* (2018.01)
*G06F 8/70* (2018.01)

(52) U.S. Cl.
CPC .......... *H04L 41/0806* (2013.01); *G06F 8/656* (2018.02); *H04L 67/34* (2013.01); *G06F 8/70* (2013.01)

(58) Field of Classification Search
None
See application file for complete search history.

(56) References Cited

U.S. PATENT DOCUMENTS

| 6,876,668 | B1 | 4/2005 | Chawla et al. |
| 8,024,808 | B1 | 9/2011 | Gleichauf |
| 9,538,616 | B2 | 1/2017 | Dijik et al. |
| 9,769,131 | B1* | 9/2017 | Hartley ............... H04L 63/0428 |
| 9,894,471 | B1 | 2/2018 | Zalewski et al. |
| 9,924,392 | B2 | 3/2018 | Cote et al. |
| 2005/0132351 | A1* | 6/2005 | Randall ............... G06F 11/1433 717/168 |
| 2007/0002897 | A1 | 1/2007 | Goshen |
| 2009/0007091 | A1* | 1/2009 | Appiah ................... G06F 8/658 717/171 |
| 2009/0150893 | A1 | 6/2009 | Johnson et al. |
| 2010/0020685 | A1 | 1/2010 | Short et al. |
| 2010/0202450 | A1* | 8/2010 | Ansari ................... G06Q 30/04 370/389 |
| 2012/0047551 | A1* | 2/2012 | Pattar ..................... H04W 4/00 726/1 |

(Continued)

OTHER PUBLICATIONS

GSM Association, IMS Device Configuration and Supporting Services, Version 1.0, Feb. 2, 2015, 34 pages, GSMA, London, United Kingdom.

*Primary Examiner* — Brian Whipple
*Assistant Examiner* — Gregory P Tolchinsky
(74) *Attorney, Agent, or Firm* — Davis Wright Tremaine LLP

(57) ABSTRACT

A technology is described for managing network communication device software capabilities. An example method may include sending a connection request from a network communication device electronically to a service provider environment. Software capabilities for the network communication device may be verified from the service provider environment. A software capabilities modification instruction for the network communication device may be received from the service provider environment. The software capabilities of the network communication device may be modified based on the software capabilities modification instruction.

20 Claims, 7 Drawing Sheets

(56) References Cited

U.S. PATENT DOCUMENTS

| | | | |
|---|---|---|---|
| 2012/0295510 A1* | 11/2012 | Boeckle | A63H 3/28 |
| | | | 446/72 |
| 2013/0139154 A1 | 5/2013 | Shah | |
| 2014/0183957 A1 | 7/2014 | Duchesneau | |
| 2014/0229928 A1* | 8/2014 | Edstrom | G06F 8/656 |
| | | | 717/171 |
| 2015/0347683 A1* | 12/2015 | Ansari | H04L 63/08 |
| | | | 726/7 |
| 2016/0036719 A1* | 2/2016 | Alicherry | H04L 67/2828 |
| | | | 714/15 |
| 2016/0092871 A1* | 3/2016 | Gordon | H04L 63/0414 |
| | | | 705/44 |
| 2016/0191723 A1* | 6/2016 | Yue | H04N 1/00209 |
| | | | 358/1.15 |
| 2017/0041454 A1* | 2/2017 | Nicholls | H04L 43/08 |
| 2017/0075676 A1* | 3/2017 | Li | G06F 8/65 |
| 2017/0085686 A1* | 3/2017 | Gilchrist | H04M 1/0254 |
| 2017/0180147 A1* | 6/2017 | Brandman | H04W 4/70 |
| 2017/0366586 A1* | 12/2017 | Bloesch | G06F 8/656 |
| 2018/0068091 A1* | 3/2018 | Gaidar | G06F 21/10 |
| 2018/0183765 A1* | 6/2018 | Neumann | H04L 63/045 |

* cited by examiner

SOFTWARE CAPABILITIES MANAGEMENT FROM A SERVICE PROVIDER ENVIRONMENT

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems. Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system.

Underlying the communications between electronic devices are network devices, which may alternatively be referred to as network connect devices, communicating devices, or network communication devices. Network communication devices are physical devices used for communication and interaction between devices on a computer network. Network communication devices mediate data in a computer network. Network communication devices may include gateways, routers, network bridges, modems, wireless access points, line drivers, switches, hubs, and repeaters; and may also include hybrid network devices such as multilayer switches, protocol converters, bridge routers, proxy servers, firewalls, network address translators, multiplexers, network interface controllers, wireless network interface controllers, ISDN terminal adapters and other related hardware.

DETAILED DESCRIPTION

Figure 1:
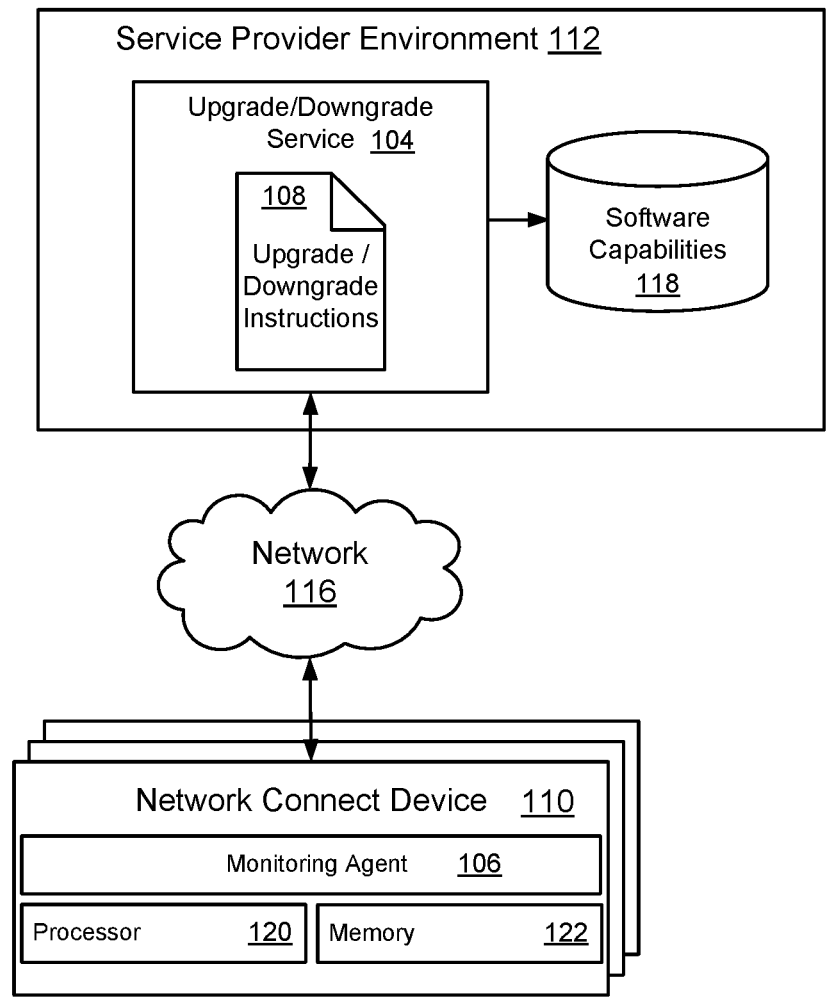
FIG. 1 is a block diagram illustrating a system for software capabilities management in accordance with an example of the present technology.

A technology is described for remotely managing software capabilities of a network communication device on-demand or dynamically. An example method may include electronically sending a connection request from a network communication device to a service provider environment. A software capabilities setting, configuration file, instruction, command or the like for the network communication device may be received from the service provider environment. A determination may be made at the service provider environment that software capabilities of the network communication device are to be modified. The determination to modify the software capabilities may be based on a verification of rights, authorization and/or payment associated with the network communication device or an account associated to the network communication device. An updated software capabilities setting for the network communication device may be received from the service provider environment. The software capabilities of the network communication device may be modified based on the updated software capabilities setting.

In another example of the present technology, a method may include receiving an electronic connection from the network communication device at a service provider environment. The network communication device may include at least a memory, a processor, and a capability to form a portion of a computer network. For example, the network communication device may be a router, a gateway, a switch, a hub, an access point, a bridge, a media server, a Network Addressable Storage (NAS) device, or end node. The method may include verifying user account information, such as rights or payment information for example, related to modifying the software capabilities of the network communication device as received by the service provider environment. The service provider environment may verify a software capabilities setting for the network communication device to the network communication device. The method may include determining that software capabilities of the network communication device are to be modified and sending an updated software capabilities setting to the network communication device from the service provider environment. The updated software capabilities setting may include instructions to modify the software capabilities of the network communication device based on the updated software capabilities setting. The instructions may cause the software capabilities to be modified by modifying a root file system of the network communication device. The service provider environment may be physically distant or remote from the network communication device. In one configuration, a payment may be received at the service provider environment for the upgrade. For example, an administrator or user may submit the request and the payment to the service provider environment. Alternatively, the request and payment may be sent to the service provider environment from the network communication device when demand on or utilization of the network communication device exceeds software capabilities of the network communication device. In one example, where an actual or requested bandwidth exceeds a maximal bandwidth currently supported, such as where the bandwidth utilization exceeds the maximum bandwidth using the 802.11n protocol, enabling the 802.11ac protocol (on the same antenna) may meet or exceed the requested bandwidth. The software capabilities of the network communication device may be upgraded by sending an upgrade signal, setting, or software package from the service provider environment to the network communication device to 'unlock' or make additional software capabilities available, at least for a defined period of time based on the payment. The software capabilities of the network communication device may be subsequently downgraded by disabling the additional software capabilities of the network communication device at the expiration of the predetermined period of time. In some examples, upgrading or downgrading the software capabilities may include enabling or disabling one or more software features such as cryptographic algorithm support (e.g., encryption, decryption, signing, authenticating, salting, etc.), graphic output quality, encoding, transcoding, virtual private networking (VPN), RAID (redundant array of independent disks) support, data streaming capability, DLNA (Digital Living Network Alliance) compliance, interpretation or compiling of a selected computing language, etc.

In another example of the present technology, software capabilities of the network communication device may be obtained by and identified at the service provider environment via an electronic network connection between the service provider environment and the network communication device. Traffic on the network communication device may be monitored from the service provider environment. The software capabilities of the network communication device may be altered at a first time by sending an upgrade setting from the service provider environment to the network communication device, and the network communication device may be altered at a second time by sending a downgrade setting from the service provider environment to the network communication device. In one example, the authorization may be based on payment information, membership in a group (e.g., beta testing group, tech support group, video service subscriber, etc.). Where authorization, such as payment, is provided for upgrades, device capabilities may be upgraded for a period of time based on the payment, or may be upgraded for shorter periods of time than are paid for based on device usage. For example, device capabilities may be enabled and disabled multiple times until the authorization expires. In other words, when a payment is made, the capabilities can be toggled on and off repeatedly until the paid amount is consumed.

FIG. 1 is a block diagram illustrating a high level example of a system and method for controlling or managing a network communication device 110 with software capabilities from a service provider environment 112. A monitoring agent 106 on the network communication device 110 may collect metrics about the network communication device 110 and transmit these metrics to an upgrade/downgrade service 104. The service provider environment 112 may access a data store of network communication device software capabilities 118 to manage, store and/or identify current software capabilities of the network communication device 110. For example, the software capabilities 118 may be determined for a device type, model or manufacture, or the software capabilities 118 may be known for a specific network communication device. The upgrade/downgrade service 104 may compare the metrics received from the network communication device 110 to the software capabilities. Then the upgrade/downgrade service 104 may report the comparison to a user or take an action authorized by the user or another party, such as to upgrade or downgrade the software capabilities of the network communication device 110, by sending upgrade or downgrade instructions 108 over a network 116 to the network communication device 110. A user may be an end-user, a manufacturer, an administrator, or another entity. In one example, an upgrade may be the addition of new or additional software capabilities to the network communication device 110 while a downgrade may be the removal of one or more software capabilities of the network communication device 110 (e.g., removal of a subset of the software capabilities).

The system may use the service provider environment 112 to dynamically manage the software capabilities of the network communication device 110, such as to enable or disable encryption, VPN (Virtual Private Network) capabilities, streaming capabilities, etc. of the network communication device 110 from the service provider environment 112. For example, by dynamically managing the software capabilities of the network communication device 110 the customer experience can be enhanced for a customer using, accessing or owning the network communication device 110.

Some hardware manufacturers for economies of scale produce large quantities of a hardware designs and artificially limit some configurations (e.g., by disabling otherwise usable software capabilities) in order to maintain the economies of scale while making different price points and differently configured models available. These may include the same hardware but with some throttled down configurations. The present technology enables modification of these artificial limitations. For example, the software of the network communication device 110 may be upgraded to enable additional software and hardware capabilities if users pay an extra upgrade fee without replacing the hardware. Hardware manufacturers and other entities (e.g., original equipment manufacturers (OEMs)) may use the present technology to implement additional upgrade or downgrade options, and/or also control the options using a simple management console or graphical user interface when circumstances change or to improve a customer's experience or the service provided.

Routing devices or other network communication devices may have multiple software capabilities, such as tunneling, network address translation (NAT), firewalling, point-to-point protocol over ethernet (PPPoe), port forwarding, content filtering, address assignment, load balancing, compression, cipher algorithms, encapsulation, replay attack prevention, MAC (media access control) address cloning, DNS (Domain Name System) proxy, bandwidth, throughput, etc., in addition to other capabilities listed elsewhere in this disclosure or which would be apparent.

In some examples, processors may have multiple SKU (stock keeping unit) numbers, categorizing the processors into a different number of cores (e.g., 1, 2 or 4) and into different CPU (Central Processing Unit) frequencies (1400 MHz, 1500 MHz, 1700 MHz, 2000 MHz, etc.). These features may be limited by the boot software and may be changeable at runtime with software modifications. The present technology uses a upgrade/downgrade service 104 in a service provider environment 112 to determine whether to enable or disable the features based on monitored traffic, authentication rights, payment for upgrades, etc. Upgrading or downgrading the software capabilities may be provided as a service or on-demand for users, either permanently or temporarily.

In one usage example, an enterprise access point as a network communication device may be throttled up when a large conference takes place near the access point. In other words, any of a number of modifications to the software capabilities may be made for the access point to better manage the increased load resulting from the large conference. For example, additional processor cores may be enabled, CPU frequency may be increased, load balancing may be enabled, etc. As another example, a home router may be upgraded to enable IPsec (Internet Protocol Security) for a VPN (Virtual Private Network) when a user requests to initiate a VPN connection.

Figure 3:
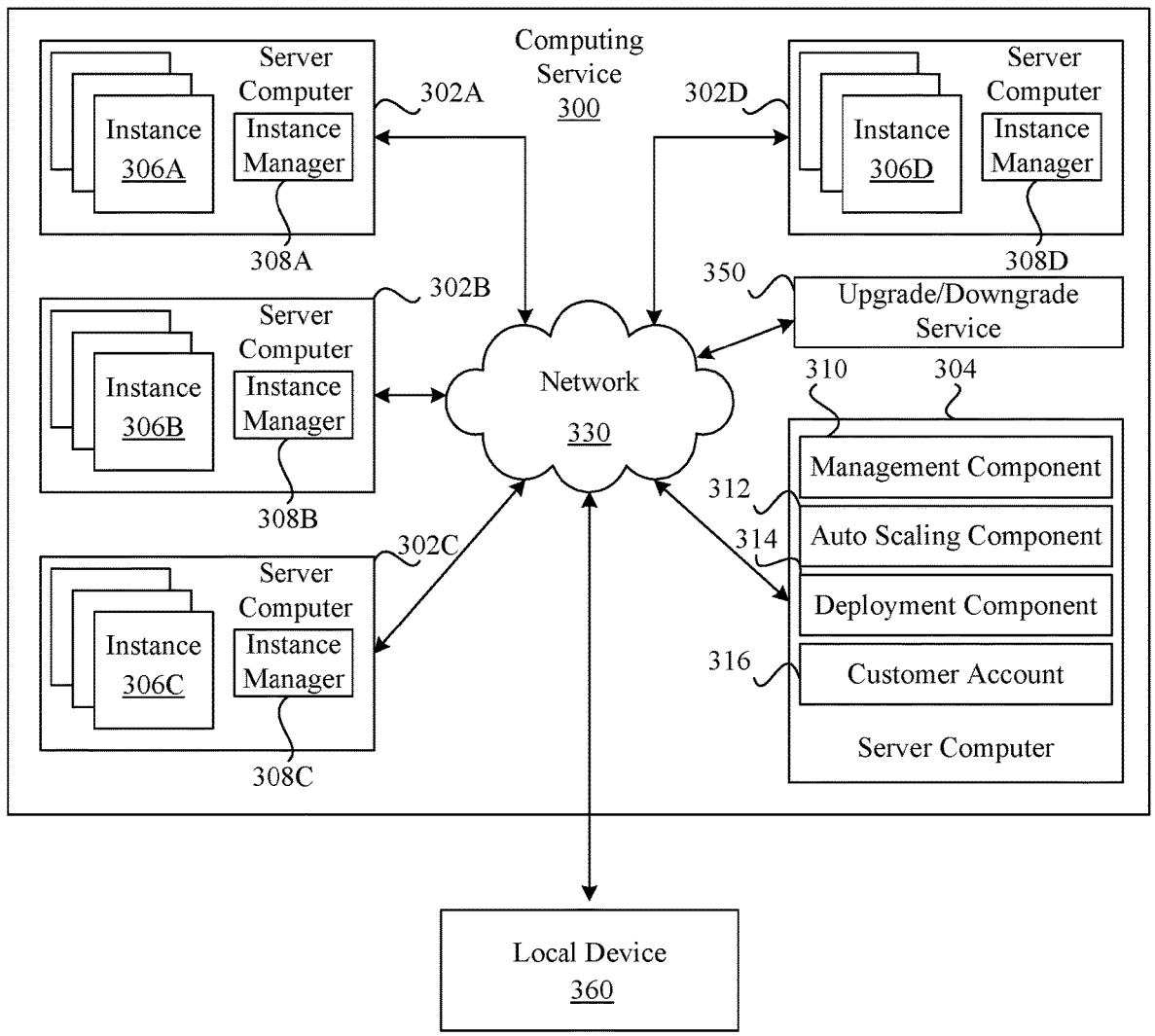
FIG. 3 is a block diagram that illustrates a service provider environment in accordance with an example of the present technology.

The service provider environment 112 may include servers for executing computing instances (e.g., virtual machines) as described in relation to FIG. 3. The computing instances may host various services associated with the devices 110.

The various processes and/or other functionality contained on the system components included in the system may be executed on one or more processors that are in communication with one or more memory modules. The system may include a number of computing devices that are arranged, for example, in one or more server banks or computer banks or other arrangements. The computing devices may support the service provider environment using hypervisors, virtual machine monitors (VMMs) and other virtualization software.

Software capabilities 118 and the like may be stored in one or more data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 112 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 116 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 1 illustrates an example of a system that may implement the techniques above, many other similar or different environments are possible. The example environments discussed and illustrated above are merely representative and not limiting.

Figure 2:
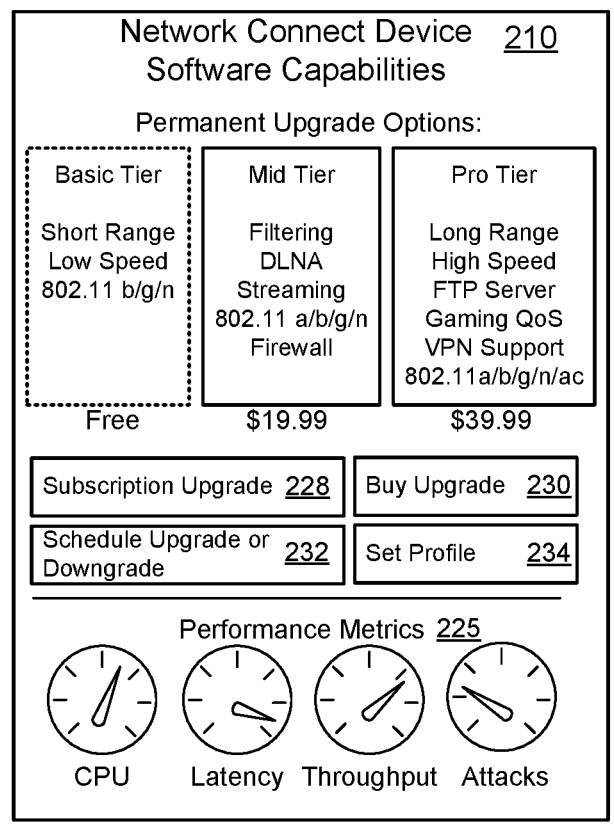
FIG. 2 is a diagram that illustrates a graphical user interface to manage software capabilities of a network communication device from a service provider environment in accordance with an example of the present technology.

FIG. 2 illustrates an example graphical user interface (GUI) 210 for managing a device. The GUI 210 may be provided from the service provider environment by the upgrade/downgrade service, for example. A network address, URL (uniform resource locator), API (application programming interface), or the like may be used to access the GUI 210.

The GUI 210 may display current device software capabilities and upgrade options, such as paid tiers for additional software features. In this example, the software capabilities are defined by basic, mid and pro tiers, where each higher tier builds on the capabilities of the next lower tier. Prices for permanent upgrades to the tier are provided. A purchase option (i.e., buy upgrade 230) is provided to enable purchasing upgrades. Subscription upgrades 228 are also available. Any of these capabilities listed in the upgrade options may be upgraded on demand, for a fee, and/or for other reasons, such as based on a type of data being processed, a source of data being received, etc.

The GUI 210 further illustrates performance metrics 225 which may be reported to a user. The performance metrics 225 are performance metrics for the network communication device. This example illustrates some metrics such as latency, throughput, attacks (e.g., DDoS, etc.). Any number of metrics of any type may be illustrated based on the monitoring of the device from the service provider environment.

In some examples not shown, the GUI 210 may enable scheduling of upgrades or downgrades, or may simply enable manual downgrading of the software capabilities. In other words, the GUI 210 may be used to dynamically control components of a system. The software capabilities may be controlled on demand, remotely, from the service provider environment over a network. The upgrade/downgrade service may enable fine grained access to controlling devices. Even small savings may add a lot of value where there are a large number of devices. In one example, a user may be holding a party on a specified date at a specified time and may desire to upgrade a wireless router to add a firewall, disable or enable encryption, or make other software capability modifications. The user may thus schedule the upgrade to happen in time for the party. A downgrade after the party is over may also be scheduled in advance.

In one example, a decreased capabilities mode of the device may provide a benefit to a user. For example, a manufacturer or other entity may incentivize users to use the decreased capabilities mode, or eco mode, by reducing a cost of services provided, by providing discounts, rebates or other monetary incentives, etc. As another example, temporary upgrades may cost the user additional money to use the additional performance capabilities.

Upgrading or downgrading the software capabilities of the device may include, for example, using upgrade/downgrade instructions 108 sent from the upgrade/downgrade service 104 to the device 110 over a network 116 (see FIG. 1). The instructions may be setting changes, file modifications, new or replacement files, installs, etc. In one example, the instructions are applied to a boot loader of the device and the device is rebooted per the instructions to complete the upgrade or downgrade. Other upgrades or downgrades may be made by making changes to a file or setting without rebooting. For some changes, although a reboot may not be performed, some applications may be restarted. What is involved in the upgrade or downgrade may depend on what is being upgraded or downgraded.

In one example, a device may be provided with a processor that is produced in mass scale. Small, large and extra-large capability network communication devices may be sold at different price points for different capacities (using the same hardware that was shipped to every customer) by changing the configuration post-manufacture by sending instructions to the device from the service provider environment. The ability to make the modifications may be restricted to a particular entity (e.g., the manufacturer) or may be accessible by any entity with the device (e.g., customers) to upgrade or downgrade capabilities. The upgrade/downgrade service may make inferences based on customer usage to help the customers make better decisions of what the configuration should be at certain times, for certain applications, etc.

The GUI 210 may also enable scheduling 232. For example, a user may schedule upgrades or downgrades, view remaining time before a pending upgrade/downgrade, etc. For a given period of time, such as during the night, a network communication device may downgrade to run in a hibernate mode rather than high capacity mode, or alternatively may upgrade to perform more processing during the night time than is performed during the daytime. For more eco-friendly modes, network communication devices running at speed may receive a slight performance capability reduction to save energy while continuing the perform tasks.

When a user selects to upgrade a network communication device, the upgrade/downgrade service monitoring for correct software capability configurations may send a new partition to the network communication device that is mounted to the local filesystem and is assigned specifically to the user and/or the network communication device using a unique hardware identifier. In this manner, the upgraded software capability settings will work on the designated hardware but not on other hardware and may be managed from a service provider environment.

To perform an upgrade, the network communication device may apply the software capability setting to a kernel, bootloader, or the like. For example, the software capability setting may be a file system partition to be added to a root file system of the network communication device. The partition may be assigned to the network communication device using a unique hardware identifier of the device. The upgrade/downgrade service of the service provider environment may monitor to verify that software capabilities in use at the network communication device match with the software capabilities associated with the network device in the software capabilities data store. The network communication device may also verify the authenticity of the software capabilities, such as by using encryption, hash values, or the like to compare what the software capabilities should be with what the software capabilities are. In this manner, the system may provide for both local and remote verification of authenticity by the network communication device and the service provider environment. Termination of service agreements, subscriptions or the like may result in downgrading the software capabilities. The downgrade may be performed by deleting or otherwise removing or disabling the root file system partition which provides the additional capabilities.

The network communication device software capabilities management technology using the methods or aspects described may be executed or maintained in a data center or service provider environment for a computing service provider. FIG. 3 illustrates how components of a data center may function as a computing service 300 in a service provider environment to provide a platform for computing instances which the present technology may use to execute nodes as described. The computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand or capability utilization. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

The computing service 300 may be used to host or provide any number of potential services to customers, such as storage, compute, or other services. In one example, an upgrade/downgrade service 350 may be provided for managing subscriptions, monitoring data, verifying authenticity of software capabilities for devices, etc. and otherwise managing upgrades/downgrades or other modifications of the software capabilities as has been described. In one example, the network device service may be hosted on one or more of the server computers 302A-302D rather than being separate from these server computers 302A-302D as illustrated.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
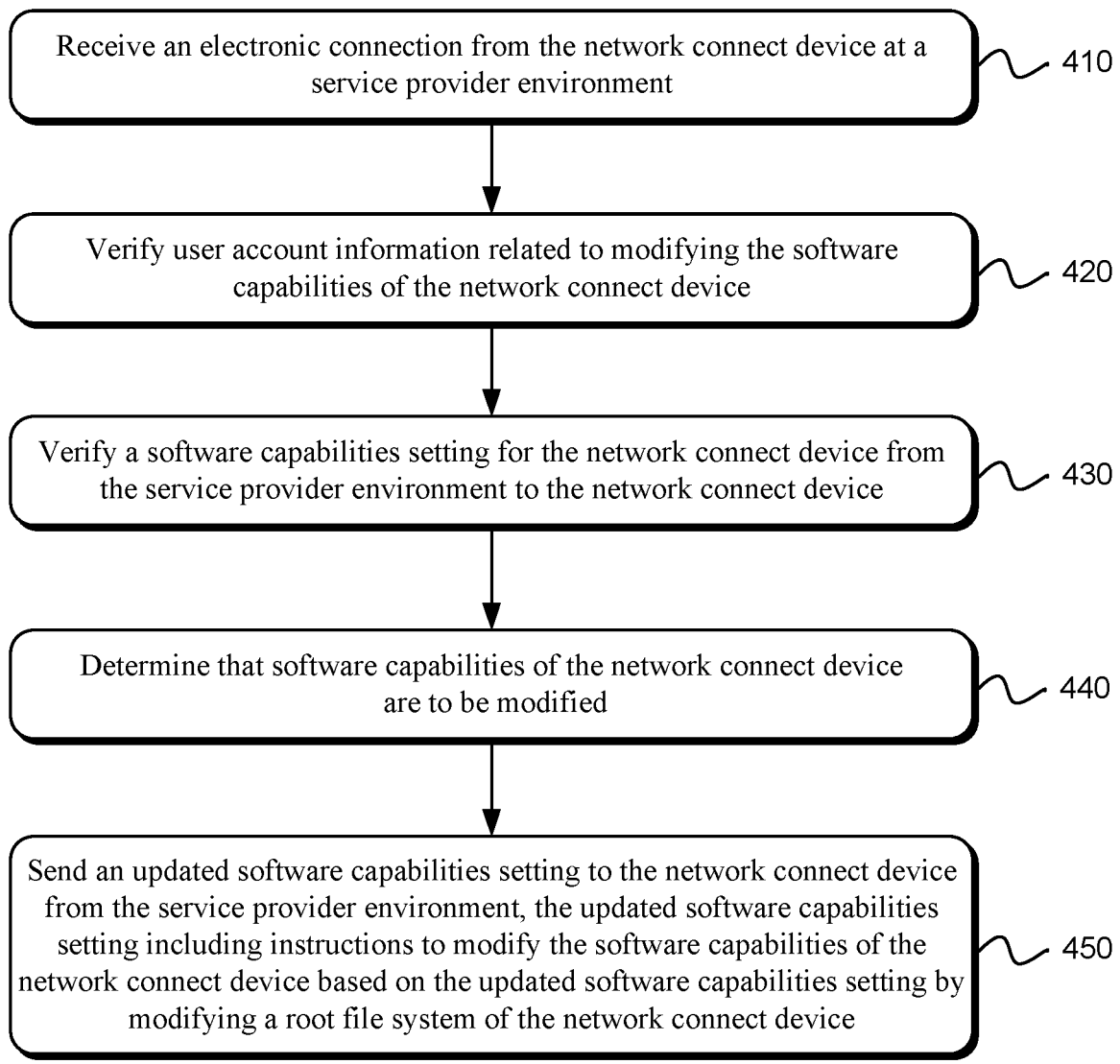
FIG. 4 is a flow diagram illustrating a method for downgrading software capabilities of a network communication device based on utilization in accordance with an example of the present technology.
Figure 5:
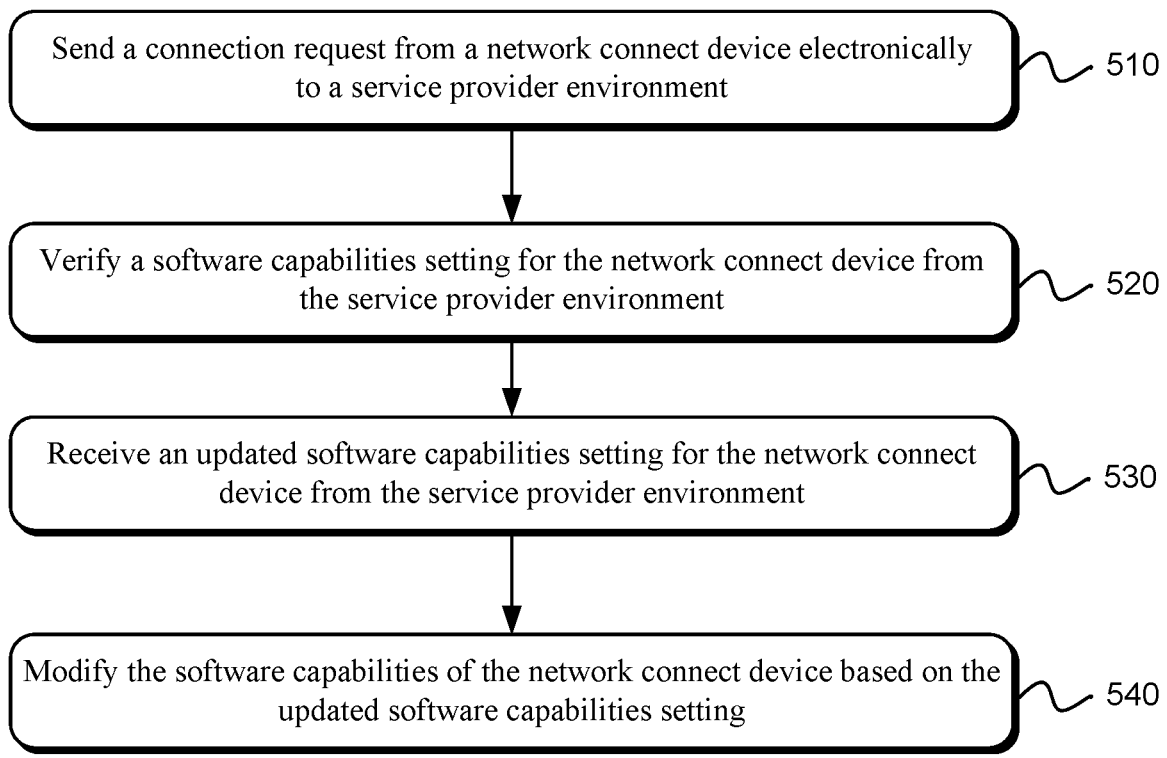
FIG. 5 is a flow diagram illustrating a method for managing software capabilities of a network communication device from a service provider environment in accordance with an example of the present technology.
Figure 6:
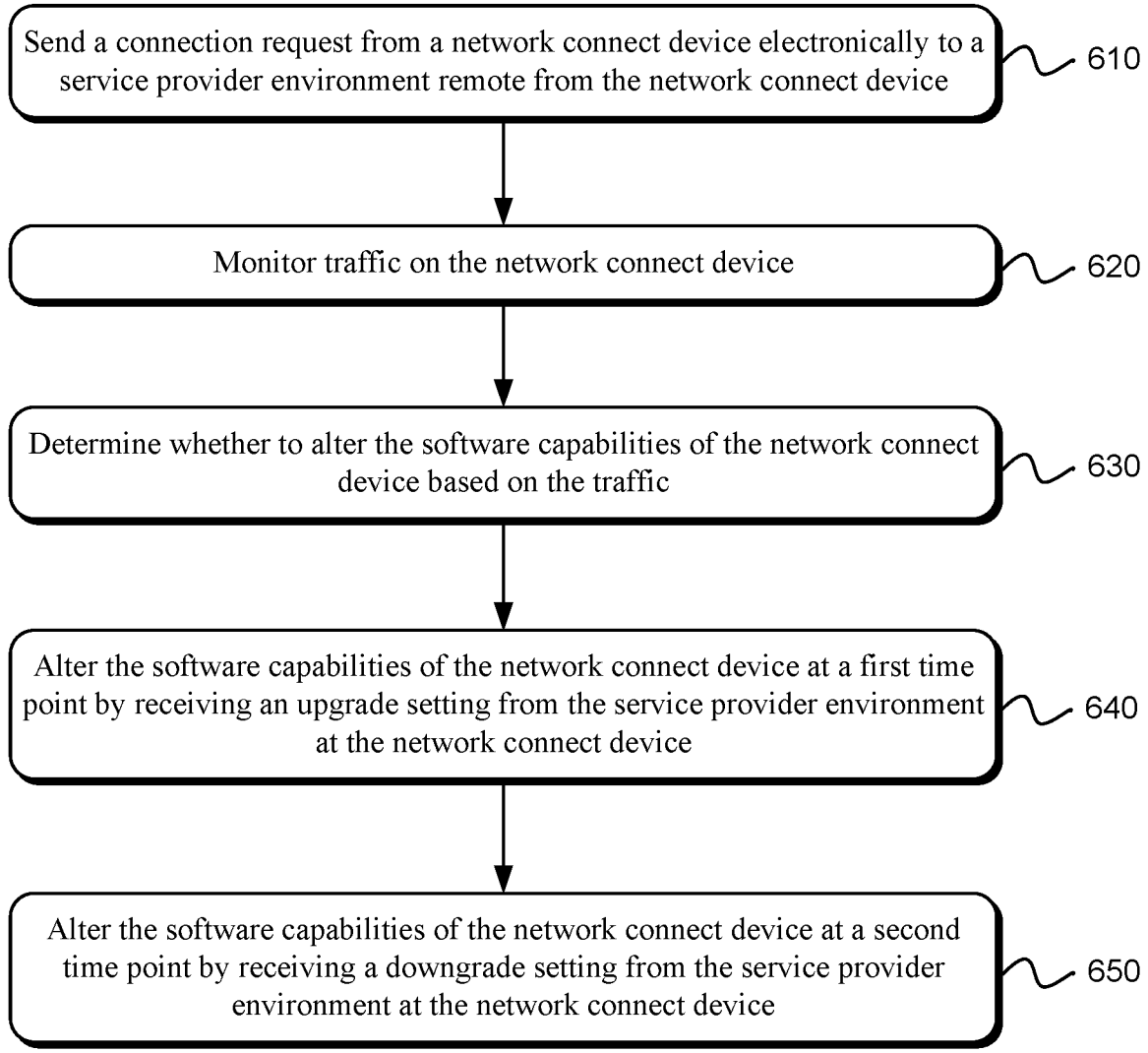
FIG. 6 is a flow diagram that illustrates a method for managing software capabilities of a network communication device at the network communication device in accordance with an example of the present technology.

FIGS. 4-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 4, a flow diagram of a method is illustrated for managing network communication device software capabilities. The method may include receiving 410 an electronic connection from the network communication device at a service provider environment. The network communication device may include at least a memory, a processor, and a capability to form a portion of a computer network. Example networking devices may include gateways, routers, network bridges, modems, wireless access points, networking cables, line drivers, switches, hubs, and repeaters; and may also include hybrid network devices such as multilayer switches, protocol converters, bridge routers, proxy servers, firewalls, network address translators, multiplexers, network interface controllers, wireless network interface controllers, ISDN terminal adapters and other related hardware.

The method may include verifying 420 user account information, such as payment information, user identity, etc., related to modifying the software capabilities of the network communication device as received by the service provider environment. Verification of user account information may include comparison of received credentials to stored credentials, or, for example, comparison of a hash value of received credentials with a hash value of stored credentials. Verification of authorization or payment information may include, for example, confirmation that payment information has been received, verification that the payment information is valid, etc. Referencing a user account permissions data store, a determination may be made as to whether the user has permission to make modifications to the software capabilities.

Verification may further include verification locally and/or remotely of the accuracy and/or authenticity of the software capabilities of the network communication device. For example, local verification of authenticity may include attempting to use the capabilities using a cryptographically signed command. If the command is unsuccessful, the current software capabilities are not authentic. The software capabilities may be received from the service provider environment and the signed command may also be received from the service provider environment and may be signed to correspond to the software capabilities package or setting sent to the network communication device, and may be specific to a unique hardware identifier of the network communication device. Use or installation of software capabilities or software capabilities modification may involve the use of public key cryptography, such as asymmetric cryptography. Verification and/or authentication may also include a remote authentication or verification from the service provider environment, which may be physically distant from the network communication device. For example, the network communication device may report software capabilities and the service provider may verify that the software capabilities are consistent with a user account associated with the network communication device or are consistent with the network communication device itself.

The service provider environment may further verify 430 a software capabilities setting for the network communication device to the network communication device. The method may include determining 440 that software capabilities of the network communication device are to be modified and sending 450 an updated software capabilities setting to the network communication device from the service provider environment. The updated software capabilities setting may include instructions to modify the software capabilities of the network communication device based on the updated software capabilities setting. The instructions may cause the software capabilities to be modified by modifying a root file system of the network communication device. The service provider environment may be physically distant or remote from the network communication device. A payment may be received at the service provider environment for the upgrade. For example, an administrator or user may submit the request and the payment to the service provider environment, or the request and payment may be sent to the service provider environment from the network communication device when demand on or utilization of the network communication device exceeds software capabilities of the network communication device. The software capabilities of the network communication device may be upgraded by sending an upgrade signal, setting, or software package from the service provider environment to the network communication device to 'unlock' or make available additional software capabilities at least for a defined period of time based on the payment. The software capabilities of the network communication device may be subsequently downgraded by disabling the additional software capabilities of the network communication device at the expiration of the predetermined period of time. In one example, a determination to modify the software capabilities of the device may be made at the service provider environment. The determination may be made based on one or more considerations, such as utilization, payment, customer request, etc. The defined period of time for the modified capabilities may be determined, at least in part, based on the payment. For example, if the customer pays for 1 hour or 1 week of upgraded capabilities, the additional software capabilities will be available to the customer for that defined time period. In another specific example, the service provider environment may monitor and manage the network communication device such that additional software capabilities are made available based on utilization of or demand on the network communication device, based on type or source/destination of network content or the like based on a prepaid fee on repeated occasions until the fee is exhausted, consuming a portion of the fee each time the additional software capabilities are enabled. In some examples, upgrading or downgrading the software capabilities may include enabling or disabling one or more software features such as encryption, virtual private network (VPN), RAID (redundant array of independent disks) support, data streaming capability, DLNA (Digital Living Network Alliance) compliance, etc.

In one example, modifying the software capabilities may include adding or removing a partition of a root file system of the network communication device. For example, additional partitions to the root file system may be added to upgrade or add software capabilities. Partitions of the root file system may be removed to downgrade or remove software capabilities. Other example modifications to modify software capabilities may include, for example, modifying a kernel of an operating system, modifying a bootloader, modifying an existing partition, modifying a file, creating/copying/deleting a file, modifying a registry or other setting, etc.

In one example, modifying the software capabilities may include temporarily modifying the software capabilities and subsequently reverting the software capabilities. For example, the software capabilities may be temporarily upgraded and subsequently downgraded. Alternatively, the software capabilities may be temporarily downgraded and subsequently upgraded. In one example, upgrading or downgrading the software capabilities may refer to adding or removing software capabilities, respectively. Temporary upgrades or downgrades may be a result of payment for upgrades or expiration of paid upgrades in one example. The method may include submitting payment information and a subscription request to the service provider environment to receive the updated software capabilities setting for a duration of the subscription. Temporary upgrades may also be available without a subscription and may optionally be for scheduled time periods. In some examples, temporary or permanent upgrades or downgrades may be unrelated to payment for the upgrades or downgrades and instead relate to traffic on the network communication device. For example, the traffic may be monitored to determine volume of traffic, type of traffic, source of traffic, destination of traffic, etc. and a determination of modifications to the software capabilities may be made based on the traffic. The source of traffic may refer to a network address, network domain, server, etc. from which traffic originates, or to an entity associated with the traffic, such as a video on demand service provider. Similarly, a destination may refer to a network address, network domain, server, etc. to which traffic is addressed or directed.

In one example, temporary upgrades may be implemented periodically based on request, demand, or other factors, using a portion of a prepaid fee each time until the fee is consumed. Alternatively, charges may be incurred according to the upgrades and fees may be post-paid. In one example, a seamless update of software capabilities may be provided without a payment or other authorization or without incurring fees. For example, use of a network communication device to access specific domain of IP addresses may result in enabling DLNA or VPN capabilities regardless of demand or payment.

The method may include providing a graphical user interface. The graphical user interface may include a plurality of upgrade options for upgrading the software capabilities of the network communication device based on current software capabilities. The graphical user interface may list a fee for each of the upgrade options. The graphical user interface may enable a payment for an upgrade to the software capabilities.

Determining that software capabilities of the network communication device are to be modified may include identifying content being transmitted or received by the network communication device and determining that the software capabilities of the network communication device are to be modified based on the content. For example, if the content is video content or word processing content or any other specific type of content, software capabilities may be upgraded or downgraded based on a profile. For example, encryption, VPN, streaming or other software capabilities may be enabled or disabled based on the content. Determining that software capabilities of the network communication device are to be modified may include identifying a network address to which data is being sent or from which data is being received by the network communication device and determining that the software capabilities of the network communication device are to be modified based on the network address by comparing the network address against a predefined list of network addresses. For example, encryption, VPN, streaming or other software capabilities may be enabled or disabled based on whether the network address is in the predefined list of network addresses.

The method may include monitoring traffic on the network communication device from the service provider environment. For example, the network communication device may include a monitoring agent configured to monitor and collect data and to report the collected data to a upgrade/downgrade service at the service provider environment. The upgrade/downgrade service may collect, aggregate, analyze, and/or report on the monitored data. The monitoring agent may monitor for any desired metric. Some examples include monitoring which applications are data packet sources, data packet destinations, data packet sizes, data packet frequency, latency, error rates, network bandwidth utilization, and so forth. Metrics data of the network communication device may be analyzed, trended, reported, etc. by the upgrade/downgrade service to identify operational performance, resource utilization, demand patterns, etc. of the network communication device being monitored. Developers, system administrators and/or end users may use the upgrade/downgrade service to collect and track metrics, gain insight, and react promptly to manage the network communication device. The upgrade/downgrade service may provide a reliable, scalable, and flexible monitoring solution that may be readily implemented and used. The upgrade/downgrade service may enable users to programmatically retrieve monitoring data, view graphs, and set alarms to assist in troubleshooting, spotting trends, and taking automated action based on the state of application(s) or service(s) in the service provider environment.

The method may include determining that software capabilities of the network communication device are unnecessary for the traffic on the network communication device. This determination may be made using the data collected by the monitoring agent and upgrade/downgrade service. When connecting the network communication device electronically to the service provider environment, the connection may include identifying the network communication device to the service provider environment. The identifying may include identifying the software capabilities of the network communication device. In another example, the service provider environment may perform a lookup in a data store based on the network communication device identification to determine the software capabilities of the network communication device. Comparing the software capabilities against the traffic, as determined by the upgrade/downgrade service, the determination of whether the software capabilities are useful or unnecessary may be determined.

The method may include downgrading the software capabilities of the network communication device by sending a downgrade setting from the service provider environment to the network communication device. For example, when the software capabilities exceed the utility of those capabilities, the software capabilities of the network communication device may be downgraded from the service provider environment. The downgrade may be performed by sending a configuration file or setting or root partition or the like from the service provider environment to the network communication device and implementing the configuration file or setting at the network communication device. In one example, a file, root partition, etc. may be considered a configuration setting. In one example, the configuration may be applied to a bootloader of the network communication device and a reboot of the network communication device may result in the new configuration being applied. As another example, some configuration changes may be applied without a reboot simply by installing, storing, or modifying a configuration file.

The method may further include monitoring the network communication device from the service provider environment to ensure the traffic is being appropriately managed with the software capabilities downgraded. If the traffic is not being managed according to a predefined policy, such as a network security policy, with the downgraded capabilities, the software capabilities may optionally be upgraded. The method may include upgrading the software capabilities of the network communication device before or after the downgrading. Upgrading or downgrading the software capabilities may be performed on-demand, and/or dynamically in response to monitored traffic. Upgrades or downgrades may be permanent or temporary. Upgrades or downgrades may be time-based or may be conditioned upon any of a variety of factors, such as traffic on the network communication device, payment for specific software capabilities, type or source of application or content being processed or accessed by the network communication device, etc.

The method may include monitoring peak demand hours and off-peak demand hours. The peak and off-peak demand hours may be determined by the upgrade/downgrade service based on historical demand. The method may include downgrading the software capabilities during off-peak demand hours and upgrading the software capabilities during the peak demand hours. In other words, the method may include determining that software capabilities of the network communication device exceed the demand at consistent time periods based on historical monitoring, and upgrading or downgrading the software capabilities may be scheduled for the consistent time periods based on the historical monitoring.

In some examples, this or other methods described herein may be implemented wholly or partially as computer readable program code executed by a processor and the computer readable code may be embodied on a non-transitory computer usable medium.

Referring now to FIG. 5, a flow diagram of a method is illustrated for managing network communication device software capabilities. The network communication device may be, for example, a router, a gateway, a switch, a hub, an access point or a bridge. The method may include sending 510 a connection request from a network communication device electronically to a service provider environment. A software capabilities setting for the network communication device may be verified 520 from the service provider environment. For example, the service provider may maintain a software capabilities data store (118, FIG. 1) to track and identify which software capabilities should be associated with each network communication device. When the connection is received from the network communication device the upgrade/downgrade service may also receive from the network communications device an identification of the current software capabilities, which may be compared to the expected software capabilities in the software capabilities data store. If the reported and expected software capabilities match and there is no other reason for modification of the software capabilities, no change may be made. However, if the software capabilities do not match, the service provider environment may send a modification instruction to the network communication device to modify the software capabilities to match the capabilities stored in the software capabilities data store. Thus, the verification may include, for example, at least one of: receipt of the software capabilities identification from the network communication device; lookup of the software capabilities in a software capabilities data store; and/or comparison of reported software capabilities with expected software capabilities to confirm the accuracy of the reported software capabilities.

A determination may be made at the service provider environment that software capabilities of the network communication device are to be modified. An updated software capabilities setting for the network communication device may be received 530 from the service provider environment. The software capabilities of the network communication device may be modified 540 based on the updated software capabilities setting. The updated software capabilities setting may be an upgrade or a downgrade. Modifying the software capabilities of the network communication device may include enabling or disabling one or more software features such as, for example, encryption, virtual private network (VPN), RAID (redundant array of independent disks) support, data streaming capability, and DLNA (Digital Living Network Alliance) compliance, etc.

Referring now to FIG. 6, a flow diagram is illustrated for a method of managing network communication device software capabilities. In this example, the method may include obtaining and identifying software capabilities of the network communication device at the service provider environment via an electronic network connection between the service provider environment and the network communication device. In other words, the network communication device may send 610 a connection request to the service provider environment, connect to the service provider environment, and provide device identity information to the service provider environment. The device identity information may include the software capabilities or the software capabilities may be inferred or looked up at service provider environment. The network communication device may monitor 620 traffic on the network communication device. Traffic on the network communication device may also be monitored from the service provider environment. A determination 630 may be made of whether to alter the software capabilities of the network communication device based on the traffic monitored. The software capabilities of the network communication device may be altered 640 at a first time by sending an upgrade setting from the service provider environment to the network communication device and may be altered 650 at a second time by sending a downgrade setting from the service provider environment to the network communication device.

In this and other example, the order of operations of the method may be varied. For example, the first time may be after the second time. Further, the method may include any number of additional operations. For example, the method may include sending a downgrade setting to the network communication device, followed by another downgrade setting, and subsequently followed by one or more upgrade settings or downgrade settings.

The method may include receiving an upgrade root partition for the root file system of the network communication device from the service provider environment and mounting the upgrade root partition to the root file system. The upgrade root partition may be assigned to a unique hardware identifier of the network communication device and may be managed from the service provider environment. In other words, the service provider environment may store and/or distribute root partitions for upgrading or downgrading software capabilities and may also maintain a data store of network communication device unique hardware identifiers. The data store may correlate the identifiers with current software capabilities, payment information, subscription information, user account or profile data, network policies, historical software capabilities, scheduled upgrades/downgrades, etc.

The method may include altering the software capabilities of the network communication device temporarily at the second time by unmounting the upgrade root partition from the root file system. The method may also include performing a local verification of authenticity of the upgrade root partition at the network communication device and requesting a remote verification of the authenticity of the upgrade root partition from the service provider environment. The network communication device may locally verify the authenticity of the software capabilities, such as by using encryption, hash values, or the like to compare what the software capabilities should be with what the software capabilities are. The dual verification may ensure authenticity of the software capabilities of a specific network communication device.

The method may include altering the software capabilities of the network communication device at the first and second times according to a user-defined schedule. The software capabilities may include any number of different capabilities or capability tiers or classes. For example, software capabilities may include a basic tier, a mid-tier and a premium tier, where the mid-tier includes more or greater software capabilities than the basic tier and the premium tier includes more or greater software capabilities than the mid-tier. In this example, the software capabilities of the network communication device are upgradable or downgradable between at least three different capability settings. However, the software capabilities may alternatively be upgradable or downgradable between two or four or more capability settings.

The method may include altering the software capabilities of the network communication device temporarily at the first time by receiving the upgrade setting from the service provider environment at the network communication device when the traffic includes a first predetermined type of content. The method may also include altering the software capabilities of the network communication device temporarily at the second time by receiving the downgrade setting from the service provider environment at the network communication device when the traffic includes a second predetermined type of content different from the first predetermined type of content.

The method may include providing a graphical user interface accessible via the service provider environment. The graphical user interface may include various upgrade options for the network communication device based on the software capabilities identified. The graphical user interface may list a fee for each of the available upgrade options and may enable the payment for the upgrade. The graphical user interface may further provide scheduling options for scheduling a future time to start the predetermined period of time for the upgrade. For example, if an increased load on the device processor is expected on a specific date, the upgrade may be scheduled to begin on or before the specific date to accommodate the anticipated increased load.

In one example, the method may include recommending a performance profile to a user. The performance profile may include predefined traffic sources or destinations, content type, or the like, based on which the software capabilities may be automatically modified to ensure traffic security, low latency, etc. The performance profile may alter the software capabilities of the network communication device based on current traffic and historical traffic.

In one example, the network communication device may include multiple network communication devices. Altering the software capabilities in this example may include sending a downgrade setting from the service provider environment to at least one of the plurality of network communication devices to reduce the software capabilities of the at least one of the plurality of network communication devices. In other words, where a user may use any number of the network communication devices or have these network communication devices associated with a single user account, software capabilities may be determined on a per device basis, such as based on demand, payment, performance profile, etc. In one example, the method may include altering the software capabilities of the network communication device at the first and second times according to user-defined schedule.

The method may include altering the software capabilities of the network communication device temporarily at the first time by sending an upgrade setting from the service provider environment to the network communication device when the demand increases. The method may further include altering the software capabilities of the network communication device temporarily at the second time by sending the downgrade setting from the service provider environment to the network communication device when the demand decreases.

The method may include determining changes to a file stored at the network communication device to alter the software capabilities of the network communication device. The determination may be made from the service provider environment. The service provider environment may then send the changes to the network communication device and the changes may be received at and implemented by the network communication device. In another example, the method may include determining changes to a bootloader of the network communication device to alter the software capabilities of the network communication device. A reboot instruction may be sent to the network communication device from the service provider environment or may be included as part of the configuration change request sent from the service provider environment with the instructions to modify the bootloader.

The method may include altering the software capabilities by sending the upgrade setting or the downgrade setting based on an application in use at the network communication device. In this example, use of predetermined applications result in sending the upgrade setting independently of the demand. As another example, processing or sending or receiving data of a particular type or to/from a specific source/destination may result in the upgrade or downgrade of the software capabilities. In these examples, a developer, publisher, content provider or other entity may contract with the service provider environment to enable increased software capabilities for the applications, data type, data source/destination, etc.

Figure 7:
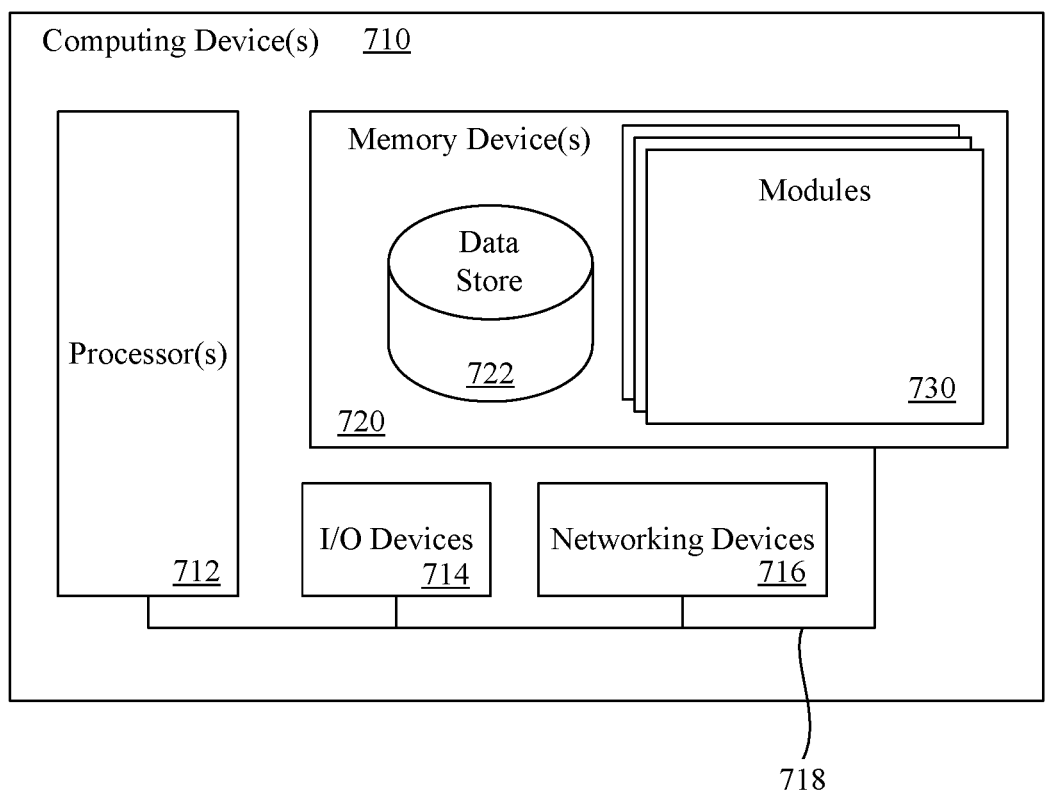
FIG. 7 is block diagram illustrating a computing device that may be used to execute a system or method for managing software capabilities in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium comprising:
    computer-executable instructions which, when executed by a processor, implement a method for modifying software capabilities of a network communication device, the method comprising:
    receiving an electronic connection from the network communication device at a service provider environment, the network communication device comprising at least a memory, a processor, and a capability to form a portion of a computer network;
    verifying service agreement information related to modifying the software capabilities of the network communication device as received by the service provider environment;
    verifying the software capabilities for the network communication device from the service provider environment, wherein a portion of the software capabilities of the network communication device are disabled to artificially limit the network communication device based in part on a service agreement;
    determining that the software capabilities of the network communication device are to be modified based at least in part on the service agreement information; and
    sending a software capabilities modification instruction, which is based on the service agreement information related to modifying the software capabilities of the network communication device, to the network communication device from the service provider environment, the software capabilities modification instruction including instructions to modify a root file system of the network communication device to enable a software capability, which had been disabled to artificially limit the network communication device, and upgrade.

2. The non-transitory computer-readable medium of claim 1, wherein the network communication device comprises a router, a gateway, a switch, a hub, an access point, a firewall or a bridge.

3. The non-transitory computer-readable medium of claim 1, wherein sending the software capabilities modification instruction further comprises sending instructions to add or remove one or more software capabilities of the network communication device.

4. The non-transitory computer-readable medium of claim 1, wherein verifying the software capabilities comprises uses asymmetric cryptographic signatures to authenticate that the software capabilities of the network communication device correspond to expected software capabilities.

5. The non-transitory computer-readable medium of claim 1, wherein modifying the software capabilities of the network communication device further comprises enabling or disabling one or more software features selected from the group consisting of: cryptographic algorithm support, virtual private network (VPN) capability, RAID (redundant array of independent disks) support, data streaming capability, and DLNA (Digital Living Network Alliance) compliance.

6. A computer-implemented method, comprising:
    sending a connection request from a network communication device electronically to a service provider environment, the network communication device comprising at least a memory and a processor;
    verifying software capabilities executable on hardware for the network communication device from the service provider environment, wherein a portion of the software capabilities of the network communication device are disabled based in part on a service agreement to artificially limit the network communication device;
    verifying information in the service agreement related to modifying the software capabilities of the network communication device;
    receiving a software capabilities modification instruction for the network communication device from the service provider environment based at least in part on the service agreement information in the service agreement, the software capabilities modification instruction includes instructions to modify a root file system of the network communication device;
    enabling a software capability, which had been disabled to artificially limit the network communication device, in order to upgrade the software capability of the network communication device based on the software capabilities modification instruction; and
    using the software capability of the network communication device after modifying the software capabilities to obtain modified performance of the network communication device.

7. The computer-implemented method of claim 6, wherein modifying the software capabilities comprises adding or removing a partition of a root file system of the network communication device.

8. The computer-implemented method of claim 6, wherein modifying the software capabilities further comprises: enabling or disabling one or more software features selected from the group consisting of: cryptographic algorithm support, virtual private network (VPN) capability, RAID (redundant array of independent disks) support, data streaming capability, and DLNA (Digital Living Network Alliance) compliance.

9. The computer-implemented method of claim 6, further comprising submitting a subscription request to the service provider environment to receive the software capabilities modification instruction for a duration of a subscription.

10. The computer-implemented method of claim 6, further comprising providing a graphical user interface, the graphical user interface including: a plurality of upgrade options for upgrading the software capabilities of the network communication device based on current software capabilities, and a fee for each of the plurality of upgrade options.

11. The computer-implemented method of claim 6, wherein determining that software capabilities of the network communication device are to be modified further comprises identifying content being transmitted or received by the network communication device and determining that the software capabilities of the network communication device are to be modified based on the content being transmitted or received.

12. The computer-implemented method of claim 6, wherein determining that software capabilities of the network communication device are to be modified comprises identifying a network address to which data is being sent or from which data is being received by the network communication device and determining that the software capabilities of the network communication device are to be modified based on the network address by comparing the network address against a predefined list of network addresses.

13. A network communication device, comprising:
a processor;
a memory in electronic communication with the processor;
instructions stored in the memory, the instructions being executable by the processor to:
send a connection request from a network communication device electronically to a service provider environment which is remote from the network communication device, the network communication device comprising at least a memory and a processor, wherein the network communication device forms a portion of a computer network, and a portion of software capabilities executable on hardware of the network communication device are disabled to artificially limit the network communication device based in part on a service agreement, and the software capabilities are identified at the service provider environment via a connection to the service provider environment;
monitor traffic on the network communication device;
determine whether to alter the software capabilities of the network communication device based on the traffic and the service agreement;
enable a software capability, which had been disabled to artificially limit the network communication device, in order to upgrade the network communication device at a first time point by receiving an upgrade instruction from the service provider environment at the network communication device, wherein the upgrade instruction is based on the service agreement and the traffic for the network communication device, wherein the upgrade instruction is associated with modifying a root file system of the network communication device; and
disable the software capability of the network communication device at a second time point by receiving a downgrade instruction from the service provider environment at the network communication device, wherein the software capability is disabled based at least in part on a change to the traffic for the network communication device.

14. The network communication device of claim 13, further configured to receive an upgrade root partition for a root file system of the network communication device from the service provider environment and mount the upgrade root partition to the root file system, wherein the upgrade root partition is assigned to a unique hardware identifier of the network communication device and is managed from the service provider environment.

15. The network communication device of claim 14, further configured to decrease the software capabilities of the network communication device temporarily at the second time by unmounting the upgrade root partition from the root file system.

16. The network communication device of claim 14, further configured to perform a local verification of authenticity of the upgrade root partition at the network communication device and request a remote verification of the authenticity of the upgrade root partition from the service provider environment.

17. The network communication device of claim 13, wherein the software capabilities of the network communication device are upgradable or downgradable between at least three different capability settings.

18. The network communication device of claim 13, further configured to respectively increase and decrease the software capabilities of the network communication device at the first time and the second time according to a user-defined schedule.

19. The network communication device of claim 13, further configured to:
increase the software capabilities of the network communication device temporarily at the first time by receiving the upgrade instruction from the service provider environment at the network communication device when the traffic includes a first predetermined type of content; and
decrease the software capabilities of the network communication device temporarily at the second time by receiving the downgrade instruction from the service provider environment at the network communication device when the traffic includes a second predetermined type of content different from the first predetermined type of content.

20. The network communication device of claim 13, further configured to increase or decrease the software capabilities by receiving the upgrade instruction or the downgrade instruction based on a source of the traffic being received at the network communication device.

* * * * *